Oct. 23, 1956 J. F. STEPHENS ET AL 2,768,026
PREMOLDED SELF-SUSTAINING AUTOMOBILE HEADLINER
WITH AIR-CONDITIONING DUCTS
Filed May 13, 1953

INVENTORS.
Joseph F. Stephens
Kenneth B. Tilbrook
BY
ATTORNEY.

United States Patent Office 2,768,026
Patented Oct. 23, 1956

2,768,026

PREMOLDED SELF-SUSTAINING AUTOMOBILE HEADLINER WITH AIR-CONDITIONING DUCTS

Joseph F. Stephens and Kenneth B. Tilbrook, Kansas City, Mo., assignors to Gustin-Bacon Manufacturing Company, a corporation of Missouri Application May 13, 1953, Serial No. 354,879

1 Claim. (Cl. 296—137)

This invention relates to headliners for automobile ceilings and refers more particularly to an automobile headliner possessing shock absorbing, heat and sound insulating and decorative qualities.

Conventional automobile headliners consist of cloth sewed along the length of a series of listing wires. The listing wires are arranged in a framework inside the top of the automobile and are spaced away from the ceiling in a manner to follow the curve of the ceiling. In applying the conventional cloth headliner it is sewn loosely to the listing wires and then steam shrunk to tighten the cloth and remove the wrinkles. Sometimes a pad of insulating material is inserted behind the listing wires and cloth liner.

There are a great many drawbacks to this conventional type of headliner. In the first place, the cloth is expensive and careful fitting is required before the steam shrinking. Furthermore, the steam operation itself requires a large amount of time in the car assembly. Such a cloth and wire headliner is deficient in shock absorbing qualities, heat and sound insulating qualities and has a very limited decorative value. It is well known in the automotive industry that the headliner itself is the most expensive part of finishing off an automobile body.

Therefore an object of the present invention is to provide a headliner for automobiles which eliminates the conventional listing wire framework supporting a cloth liner and composes a resilient, flexible, dimensionally stable, fibrous mat.

A further object is to provide an automobile headliner which may be installed without fitting or steam shrinking and which requires far less installation time than the conventional headliner.

A further object is to provide an automobile headliner having highly superior shock absorbing and heat and sound insulating qualities compared to the conventional headliner.

A further object is to provide an automobile headliner composed of a resilient, flexible, dimensionally stable, fibrous mat, the mat being faced with a resilient film of plastic material which may optionally have a decorative pattern impressed on it.

Other objects and features will appear in the course of the description following.

Referring to the drawings which show an embodiment of the invention and in which like numerals are used to indicate like parts:

Figure 1:
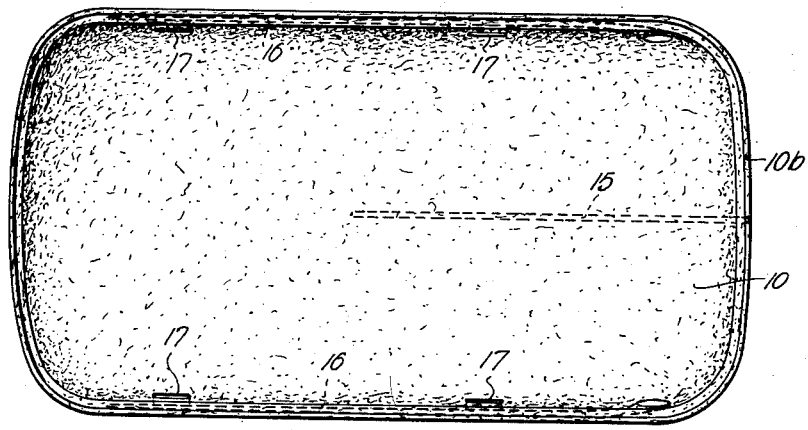
Fig. 1 is a bottom plan view of an automobile headliner embodying the present invention.
Figure 2:
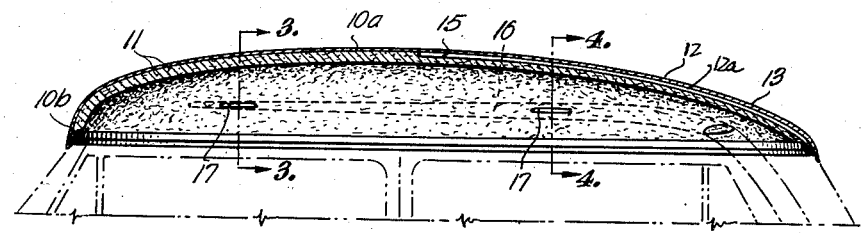
Fig. 2 is a side sectional view of such an automobile headliner in place in the roof of an automobile.
Figure 3:
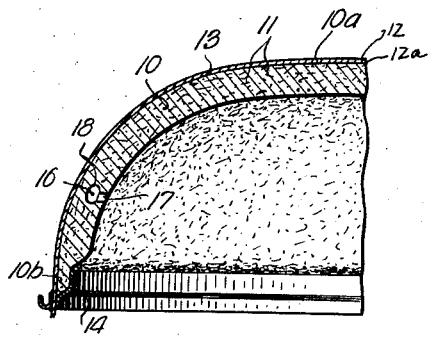
Fig. 3 is a view taken along the line 3—3 of Fig. 2 in the direction of the arrows.
Figure 4:
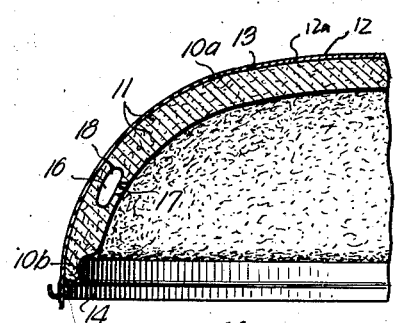
Fig. 4 is a view taken along the lines 4—4 in the direction of the arrows of Fig. 2.

The headliner 10 comprising the present invention is made up of a resilient, flexible, dimensionally stable, fibrous mat. The fibers 11 of this mat may be composed of different materials but are preferably of glass and have an average diameter of 10 microns or less. These fibers 11 are bonded together by a thermosetting plastic binder into an open skeleton-like structure to form a unitary mat honeycombed throughout with interstitial air spaces. In its preferred form the mat has a density of between 2½ and 7 pounds per cubit foot.

The following applications employ a mat composition which is especially suited to the practice of the present invention: Serial No. 318,856 filed November 5, 1952, inventors Joseph F. Stephens and Glenn W. Kerr, illustrating the method of manufacture, physical characteristics, and heat insulating properties of the mat; Serial No. 317,141, filed October 27, 1952, now abandoned, inventor Joseph F. Stephens, illustrating the acoustical and sound insulating qualities of the unfaced mat; and Serial No. 355,850, filed May 18, 1953, inventor Joseph F. Stephens, illustrating the acoustical and decorative properties of the film-faced mat.

The headliner mat is molded to a concavo-convex structure in such a manner that its convex surface 10a matches and fits the concave inner surface 12a of an automobile top 12. In most cases it is possible to mold the headliner in a one-piece structure. However, in the longer bodied automobiles, it may be necessary to hold the headliner in two or more pieces to enable the structure to be cleared through the automobile doors during installation. Due to the remarkable qualities of the mat used it has proved possible to match the compound curves of an automobile ceiling in molding the mat while keeping the mat face free from wrinkling. In developing this mat the most severe radii of curvature in car roofs back to the 1949 models were determined and headliners molded to match these curves. In all cases it was possible to produce in the headliner the desired compound curves without wrinkling the interior surface of the mat. The headliner may be supported within the roof of the car by means of an adhesive 13 between the convex surface of the mat and the concave surface of the roof of the car. However, it is preferable in some cases to provide crimped or compressed edges 10b to fit into channel positioners 14 along the inside edge of the roof 12. The entire edge or selected portions of the edge may be compressed to the desired thickness in the molding process while still maintaining the smooth and attractive appearance of the overall surface of the headliner. In order to provide for the necessary electrical wiring for the illumination of the car interior, channels 15 may be formed in the convex surface of the mat. This type of headliner 10 is eminently adaptable to the employment of an air conditioning system within the car. Commonly, in such air conditioning, a refrigerating coil within the rear compartment of the car, circulating a refrigerant from a compressor driven off the engine, cools air which is then blown into the car body. It is convenient to mold the headliner with air ducts 16 within the mat running the length of the car roof 12 and having either slots 17 or a plurality of diffusion openings positioned at the desired points along the length of the ducts. If desired, the ducts may be molded to control the volume distribution of the air; for example the diameter of the duct may constantly diminish from the rear to the front end of the headliner. When such air conditioning ducts are employed, their surfaces are ordinarily coated with a smooth surfacing material 18 such as a plastic to reduce air flow friction and minimize absorption loss in the mat itself. The duct passages 16 themselves, in this construction, are completely surrounded by the body of the mat. The formation of either the wiring channels 15 or air conditioning ducts 16 in the molding process does not distort the visible concave face of the mat. The mat itself may be produced in many attractive color combinations by the simple expedient of mixing dye materials with the plastic in the process of molding the mat. Furthermore the surface of the mat may be treated in the molding process so as to produce many decorative patterns which give varied shadow and light effects and offer considerable decorative potentialities.

This mat as set forth in application Serial No. 318,856 mentioned above has considerable heat insulation properties. Furthermore as set forth in application Serial No. 317,141 of Joseph F. Stephens, which relates to "Acoustical Insulation," a headliner composed of this mat has superior sound insulating qualities.

It may often be desirable to face the concave surface of the formed headliner with a resilient film of plastic material (not shown). This plastic film may be composed of various materials applied in a number of ways to the mat such as are set forth in the copending application of Joseph F. Stephens, Serial No. 355,850, mentioned above, which relates to "Acoustical Insulation." It should be noted that the employment of such a film facing on the headliner markedly improves the sound insulating qualities and offers further opportunity for decoration in the coloring of the film and the inlaying of patterns on the film.

When a conventional automobile headliner is damaged by perforation or tearing of the cloth, it is sometimes possible to stitch the torn spot or it may be necessary to replace a large panel of the cloth. The stitching remains as an unsightly blemish on the ceiling, and, if it is necessary to replace the cloth, reinstallation and steam fitting is expensive. In the present invention, if the headliner is damaged, it is iossible to easily cut out the damaged portion in the same manner as cutting out a watermelon plug and replace it with a new, matched pattern. The replaced portion may be then sprayed over, if desired, thereby completely removing all traces of injury. In this manner any damage to the applicant's headliner may be easily and conveniently replaced with no necessity of replacement of the entire panel.

From the foregoing it will be seen that a novel form of headliner has been provided which is inexpensive and easily and quickly fitted, has superior shock absorbing, heat and sound insulating qualities, and enhanced decorative possibilities.

Furthermore, it is obvious that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

A headliner for an automobile top comprising a resilient, dimensionally stable fibrous mat molded to a concavo-convex shape retaining structure, the convex surface of the entire mat adapted to fit the inner concave surface of said automobile top to be entirely supported thereby and an air flow duct formed internally within the mat for air conditioning purposes, said duct having an inlet opening and a separate outlet opening positioned along the length thereof.

References Cited in the file of this patent

UNITED STATES PATENTS

| | | |
|---|---|---|
| 1,640,592 | Bourgon | Aug. 30, 1927 |
| 1,850,705 | Carlson | Mar. 22, 1932 |
| 2,271,829 | Powers | Feb. 3, 1942 |
| 2,371,313 | Rast et al. | Mar. 13, 1945 |
| 2,489,242 | Slayter | Nov. 22, 1949 |
| 2,521,984 | Lang | Sept. 12, 1950 |